Oct. 31, 1950     W. A. FLUMERFELT     2,528,221
COMBINED SWIVEL AND INTERNAL EXPANDER
Filed Nov. 29, 1946
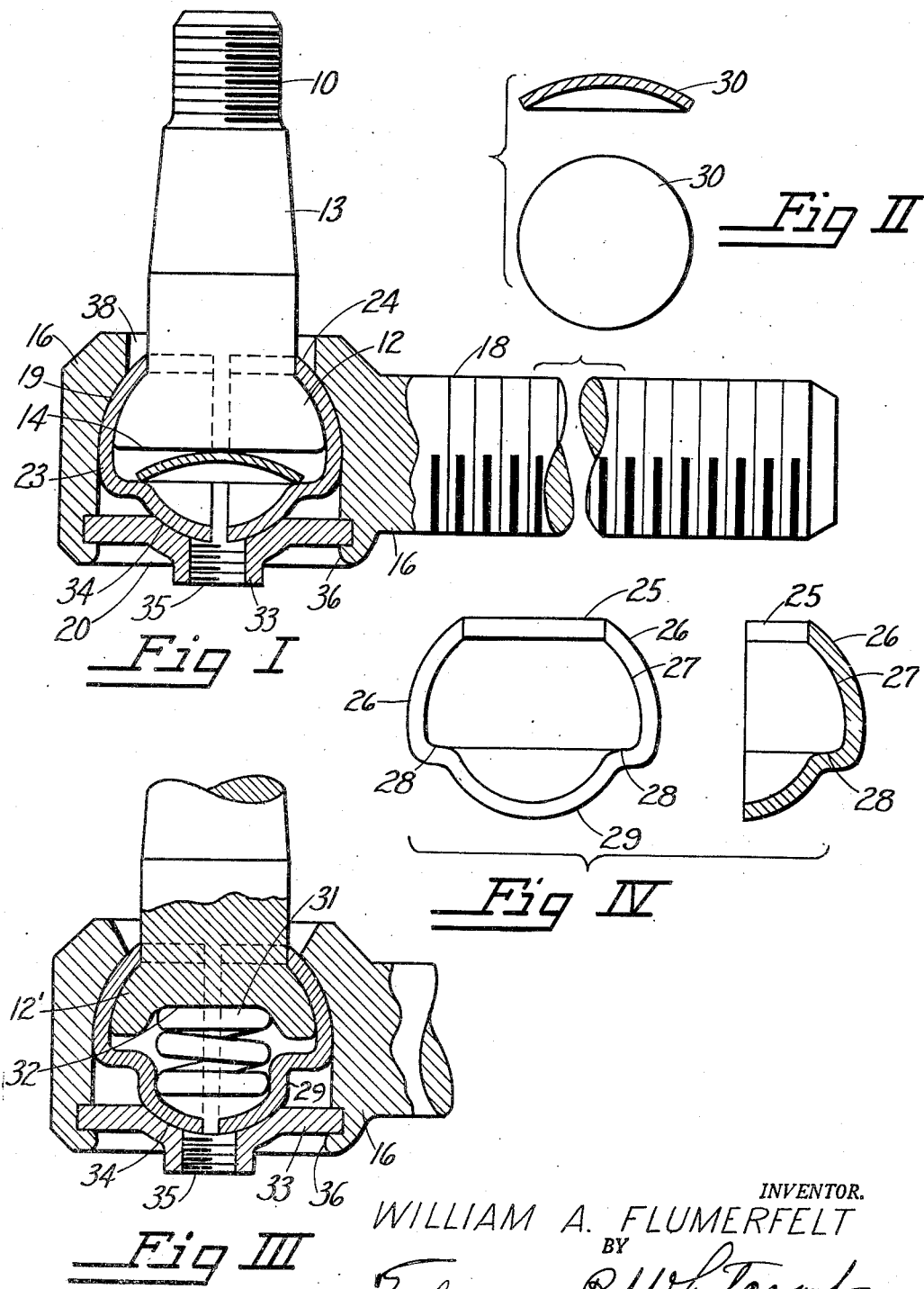
INVENTOR.
WILLIAM A. FLUMERFELT
BY
Edmund B Whitcomb
Attorney Patented Oct. 31, 1950

2,528,221

UNITED STATES PATENT OFFICE 2,528,221

COMBINED SWIVEL AND INTERNAL EXPANDER

William A. Flumerfelt, Columbus, Ohio, assignor to The Columbus Auto Parts Company, Columbus, Ohio, a corporation of Ohio Application November 29, 1946, Serial No. 713,031

3 Claims. (Cl. 287—90)

This invention relates to ball and socket joints and has for an object to provide a unique construction in which an internally arranged expanding means may form a pivot for movement of parts of the joint, the expanding means operating to continually maintain all the several parts in operative position in use and also to take up for wear.

An important feature of this invention also includes the arrangement of ball and seats; the housing therefor and the special construction and location of the seats therein; the relation thereof to the spherical portion of the ball; to the working surface of the housing for the seats providing increased bearing area, and to the means to maintain alignment with increased freedom of movement.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I is a vertical sectional view with parts in elevation of one embodiment of my invention;

Figure II is a plan and side view of the details of the disc spring used in Figure I;

Figure III is a vertical sectional view of another embodiment of my invention; and Figure IV shows an elevation and section of the two cooperating seat units used in both embodiments.

In one specific embodiment of my improved universal ball and socket joint, illustrated in Figures I, II, and IV, I have provided a ball stud 10 which may be cold headed to form an enlargement or ball head section 12, the same having a flat bottom end surface 14, as shown. The ball portion 12 is thus integral with and connected to stud 10 by the neck 13.

The housing 16, having the threaded extension 18, forms the enclosure for the unit and is provided internally with a coined semi-spherical cavity bearing surface 19, the housing 16 being open ended at the other end as indicated at 20. The seats for the joint are made from a simple stamping, the details of which are illustrated in Figure IV. To this end, the stampings may be made in the form indicated by two punch press operations without lathe trimming. I here use two such cooperating seat units 23 and 24. Each of said units is formed with a main section having a spherically shaped outer surface 26 for fitting into housing cavity 19 and corresponding spherically shaped inner surface 27 to fit around the ball head 12, as well as with an internal ledge 28 and a depending curved pivotal section 29. The outer bearing surface 26 of these seats fits into and cooperates with the bearing surface 19 in the cavity of the housing 16 while the inner bearing surface 27 of each of the seats conforms to and fits around the head 12 of the ball. The depending spherical pivotal section 29 is struck from the same center of the seat members as the main bearing surfaces 26 and 27 although of a smaller radius. The upper end of each of the half seats 23 and 24 has a circular shaped opening 25 to fit rather snugly the neck 13 of the ball stud 10.

In my present invention, I utilize a spring member 30 forming both a pivot, for movements of the joint (the rim of which rests on ledge 28), and also an internal outwardly expanding means to maintain all the parts of the joint in constant proper cooperating position, all relative to each other and also to compensate for wear. As a specific embodiment of this feature, I provide a simple Welsh plug or flat cup-shaped plate spring 30. As shown in detail in Figure II, such a Welch plug has no fracture points and permits the ball to turn thereon substantially without friction. This Welch plug or curved spring piece 30 may be made in one operation on a punch press and requires substantially less material than the coiled type of spring illustrated in the other embodiment of my invention.

The lower open end of the housing 16 is closed by supporting plug 33, which may be in the form of a stamped sealing washer and can be readily made in a punch press. The sealing washer 33 is provided with a curved central depression or seat 34 for receiving the lower extension 29 on the ball seats 23 and 24. The central portion of the sealing washer 33 is provided with a screw threaded extension 35 of sufficient length to receive a suitable grease fitting. As illustrated in Figure I, the housing or socket 16 at the lower end is crimped over, as indicated at 36, to retain the sealing washer 33 in place.

The opening 38 in the upper end of the housing 16 is of sufficient diameter to permit the suitable oscillation of the joint in use, but not large enough to permit the head 12 of the ball stud to pass therethrough, the ball being assembled by passing the shank 10 through the other open end 20 of the socket before the seat 33 is crimped in place.

In operation, the spring curved plate 30 constantly urges all the joint parts in close intimate contact, excepting as to the space between the two seats 23 and 24 at their vertical adjacent edges at diammetrical opposite sides of the joint when two similar seats as shown in this particular embodiment of my invention are used.

The coined socked surface 19 forms a bearing for the external surface 26 of each of the sheet metal ball seats 23 and 24 to rotate or oscillate upon. The ball head surface 12 also rotates on the inner surfaces 27 of seats 23 and 24 since oscillation is restricted by the cylindrical portion of the upper ends of the seats in contact with the cylindrical neck portion of the stud 13. The bottom flat surface 14 of the ball stud turns, as indicated above, on the top or outside surface of the upwardly curved plate 30 as a pivotal point or area.

The spring member 30 is assembled under compression when the ball and seats are initially inserted in the housing through the open bottom end 20 of housing 16 before the sealing washer 33 is inserted in place. Expansion of spring 30 urges the ball head 12 into contact with the inner surfaces 27 of ball seats 23 and 24. Ball head 12, being larger at one diameter (say the equator) than at any others, and being urged by the spring member 30 toward the constricted open end of the seats 23 and 24, the spring constantly expands the seats (23 and 24) into contact with the walls of the housing and continuously holds all parts in close working position, the spring together with the seats and stud oscillating as a unit with respect to the wall of the housing as will be understood.

Since the spherical seat in the bottom washer 33 is generated from the same center as the spherical seat in the upper half of the socket and even though it is smaller in size, it satisfactorily cooperates with the spherical seat in the socket for purposes of correct operation in the oscillation and rotation of the seat members 23 and 24 and the extension 29 in the joint. The expansion of seats 23 and 24 is also effective to cause the bottom seats 29 thereof to be held against the segmental spherical seating surface 34 in the end washer 33.

As between ball head 12, the seats 23 and 24 and the surface 19 of the housing 16, I provide for multiple wearing surfaces as follows: between the spherical seat 19 in the socket and the external surfaces 26 on the seats 23 and 24 and also between the inner surfaces 27 on seats 23 and 24 and the spherical surface on the ball head 12, all acting in combination either when oscillating or rotating, as the case may be. In operation, the rotation occurs between one or the other of those surfaces on which the torque or friction is least, at the moment. It may occur between surfaces 19 and 26 or between surfaces 27 and the ball head 12, or partly between one pair of mating surfaces and the other pair and shifts as the friction at various contacting surfaces changes. The shifting of the coacting sliding surface thus provides a new surface or surfaces at the point of torque rather than remaining in one position and the same abrade until the surfaces shift to a new position where the friction is not so great, thus relieving excessive friction in operation.

Wear will permit the ball stud 10 to move in the direction of the opening 38 in the socket but center to center dimension between the ball studs in the opposite ends of the assembled tie rod will not change, or the alignment is maintained.

In the embodiment of Figure III, I have shown a coil spring 31 instead of the flat spring 30 of Figure I. In this instance the bottom of the ball 12' is formed with a recess 32 to receive the upper end of the coiled outwardly expanding spring 31, thus locating the latter in place at the upper end. The lower end of spring 31 fits into the upper side of the cup like lower extension 29 of the seats 23 and 24. Otherwise, the structural arrangement of the embodiment shown in Figure III is similar to the parts and their association is illustrated in the embodiment of Figures I, II and IV, and the operation of the joint shown in Figure III is similar to that described above in connection with the operation of the structure of Figure I. Moreover, the parts are assembled in Figure III as in Figure I with the coiled spring 31 of Figure III under initial compression.

It is apparent that, within the scope of the invention, modifications and different arrangements may be made other than are herein disclosed, and the present disclosure is illustrative merely, the invention comprehending all variations thereof.

What I claim is:

1. In a ball and socket joint, the combination of a housing member and a ball and stud member, said housing having an opening in one end through which the stud extends, the inner wall of said housing also having a spherically shaped seating portion and an enlarged portion; a pair of seat members located between the housing and the ball, each seat member having a main spherical shaped portion contacting the spherical wall in said housing and an extension on said seat members terminating in a pivoted end bearing portion of smaller radius than said main seat portion; a resilient means interposed between the end of said ball and said seat members; and means adapted to form a support for the pivotal extension of said seat members and close one side of said housing, said means having a spherically shaped bearing surface struck from the same center as the said housing bearing surface, the center of said bearing surface being in line with the center of the stud in normal position, said resilient means arranged to maintain the parts of said ball and socket joint continuously in contact and compensate for wear.

2. In a ball, stud, and socket joint, the combination of a housing member, said housing having an opening in one end through which the stud extends, the inner wall of said housing also having a spherically shaped seating portion at one end thereof; a ball stud, ball part, seat and take up unit located within said housing, said unit including a pair of separate seat members located between the housing and the ball, each member consisting of one piece having a main spherical shaped portion contacting the ball and the spherical wall in said housing; said spherical portion terminating in an open end adjacent said stud at the line of its connection with said ball; and an extension on each of said seat members terminating in a pivotal end bearing of spherical configuration struck from the same center as the first-mentioned spherically shaped portion of the seat members and of smaller radius than said main seat portion; resilient means interposed between the end of said ball and said seat members; and means adapted to form a support for the pivotal extension of said seating members and close one end of said housing; said means having a spherically shaped bearing surface struck from the same center as the said housing bearing surface, the center of said bearing surface being in line with the center of the stud; said stud, resilient means and seat members adapted to oscillate as a unit relative to said housing, said resilient means arranged to maintain the parts of said ball and socket joint continuously in contact.

3. In a ball and socket joint, the combination of a housing member and a ball and stud member, said housing having a restricted opening in one end through which the stud extends, said housing also having an inner spherically shaped seating portion and an enlarged portion; a pair of seat members, each having a spherical shaped portion contacting the ball on the inside and on the outside the spherical wall in said housing; said seat portions having an internally extending transverse portion forming a ledge; said ledge connected with a downwardly depending spherically shaped extension to form a pivotal bearing; a resilient inverted cup shaped sheet metal disc interposed between the end of said ball and said ledge on said seat members, the end of said ball being supported on the top portion of said disc and adapted to rotate thereon; and means to close one end of said housing and form a bearing surface for the pivotal bearing of the extension of said seat members, said resilient disc arranged to maintain said ball and socket joint elements continuously in operative contact and compensate for wear.

WILLIAM A. FLUMERFELT.

REFERENCES CITED

The following references are of record in the file of this patent:

UNITED STATES PATENTS

| Number | Name | Date |
| --- | --- | --- |
| 1,499,298 | Eller | June 24, 1924 |
| 1,844,340 | Sneed | Feb. 9, 1932 |
| 2,189,266 | Klages | Feb. 6, 1940 |
| 2,205,981 | Klages | June 25, 1940 |
| 2,281,097 | Flumerfelt | Apr. 28, 1942 |